Nov. 15, 1955    H. W. PARKER    2,723,584
SELF-THREADING NUT WITH GUIDE FLANGE
AND CHIP RECEIVING RECESS
Filed May 27, 1952
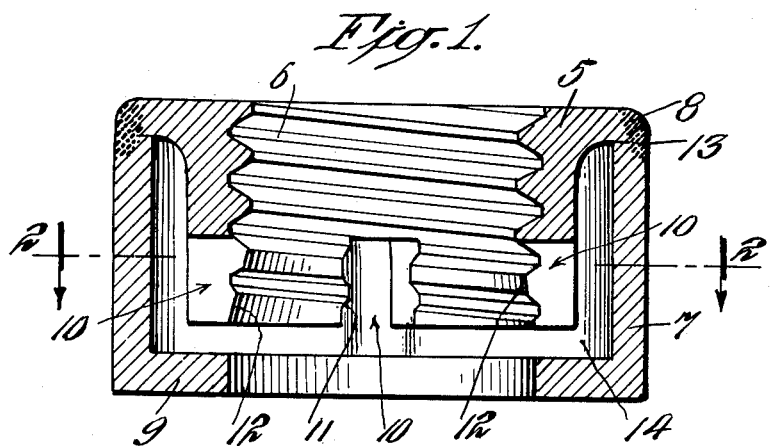
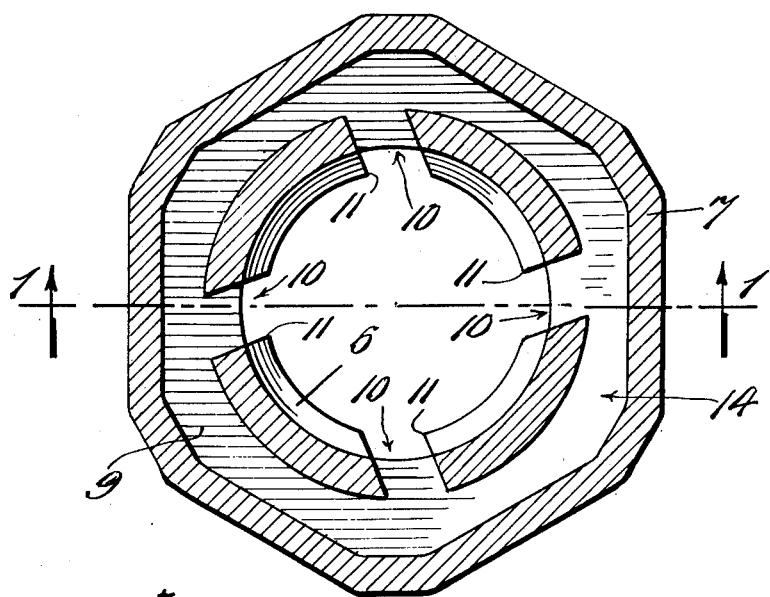
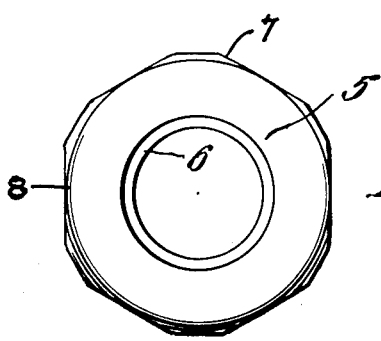
INVENTOR.
HENRY W. PARKER
BY
ATTORNEY

United States Patent Office

2,723,584
Patented Nov. 15, 1955

2,723,584

SELF-THREADING NUT WITH GUIDE FLANGE AND CHIP RECEIVING RECESS

Henry W. Parker, Flushing, N. Y.

Application May 27, 1952, Serial No. 290,147

1 Claim. (Cl. 85—32)

The invention herein disclosed has been termed a "self-threading nut" because it combines in the one unit a die which will cut its own thread on a bolt stud and which after threading its way on the stud, will end by serving as a nut intimately connected with and affixed to the stud.

Objects of the invention have been to provide a bolt stud threading nut which will operate successfully as a thread cutting die and which will be of such low cost as to provide a more practical and economical substitute for present day bolt and nut fastenings.

Particularly it has been a purpose of the invention to provide a fastening of this character which may be applied by an ordinary power driven nut applying tool.

Other special objects of the invention have been to combine in one simple integral unit the necessary thread cutting facilities and the body structure required for effecting the thread cutting and nut tightening operations.

Special objects of the invention also have been to effect clearance and disposal of the chips removed in the thread cutting operation of the nut.

Further special objects of the invention have been to produce the two associated elements of the combination, that is, the thread cutting portion and the body forming portion as two separate, readily manufactured items and to unite these effectively in a single integral organization having the size, appearance and other characteristics of a regular standard nut.

Other desirable objects attained by the invention and the novel features through which the purposes of the invention are effected are set forth and will appear in the course of the following specification.

The drawing accompanying and forming part of the specification illustrates a present practical embodiment of the invention. It will be understood, however, that the structure may be modified and changed in various ways, all within the true intent and broad scope of the invention as hereinafter defined and claimed.

Fig. 1 in the drawing is a central cross sectional view of the die nut as appearing on substantially the plane of line 1—1 of Fig. 2;

Fig. 2 is a horizontal sectional view of the nut shown in Fig. 1, as taken on substantially the plane of line 2—2 of that figure;

Fig. 3 is a top plan view of the nut.

Basically the nut is made up of a central thread cutting die in the form of a sleeve or ferrule 5, internally screw threaded the full length, as indicated at 6, and an enclosing cup or shell 7 of hexagonal or other external nut formation united at the top with a flange 8 of the die element, this flange forming the top or head of the nut, and having at the bottom an inwardly projected annular flange 9 forming the base of the nut.

The inner thread carrying and thread cutting member is made of hardenable steel and the hexagonal shell or cup is made of mild steel. These both can be produced in the forms shown, the die element with an outwardly turned flange and the shell element with an inwardly turned flange, at relatively low cost, by ordinary or special drawing operations, from suitable sheet stock.

The inner or lower end of the die element is shown as longitudinally slotted at 10, the cuts extending preferably through several turns of the screw threads and being inclined from the radial on lines providing the proper angle for the screw thread chasing cutter faces 11.

Also, the cutting segments provided by the slots are preferably tapered as indicated at 12, to give the nut a proper lead over the bolt stud.

After effecting the drawing, screw threading and slotting operations, this inner, core section of the nut may be case hardened or otherwise treated to give it the necessary thread cutting temper.

The flange 8 which forms the head of the nut is integrally united to the wall or side portion of the shell by being engaged thereover and welded thereto by a flash radiofrequency weld, as indicated at 13 in Fig. 1.

This radiofrequency weld is made around the rim of the nut in a few milliseconds, so fast that the temperature elevation is so small that the temper of the die is unaffected by the welding.

For cost reasons the flange 8 may be circular, with a diameter equal to the distance across the flats of the nut so that it will have sufficient bearing area although not completely covering the hexagonal contour of the shell. When the weld is made there is sufficient flow of molten metal to smooth the edge of the nut acceptably.

The flange 8 being a part of the hardened member, provides a good, solid head for the nut and the flange 9, forming part of the mild steel shell member, provides a desirable holding and seating base for the nut. The latter flange extends inwardly to the approximate root diameter of the nut threads and serves as a guide for directing the nut over the bolt stud and as a guard to prevent attempted application of the nut to oversize stud rods which might overburden the initial cutting edges of the die.

As an example, a nut for threading a one-half inch rod might have an entry opening in the guard flange 9 approximately 0.505" diameter and this, as shown in Fig. 1, would be about the same size as the tapered entrance 12 in the cutting end of the nut.

The tubular portion of the inner threaded member is spaced inwardly from the wall portion of the surrounding shell, providing a clearance space 14 about the thread cutter section, of sufficient capacity to hold the chips and cuttings.

The invention eliminates the need for threaded bolts. Unthreaded bolt stock may be used. This is of advantage when using butt welded studs. These can be plain, unthreaded rod stock and the nuts can be screwed thereover by a power tool, a single quick operation threading the stud and setting the nut in fast, screw-threaded engagement on the stud.

The invention also eliminates the need for shrinkage compensations in adhering to standard sizes, since interchangeability is of no consideration because the nut threads the stud at the time and place of fabrication and the nut remains in place, ordinarily as a "used once" item.

Also, there is no tolerance in the self-threading die nut thread, since there is intimate contact between the nut and the stud.

This intimacy of engagement ordinarily may make it unnecessary to use lock washers or other lock nut features.

Further, the rapid radiofrequency flash weld joining of the two parts makes it possible to provide a chip cavity within the nut, an essential or highly desirable feature in this case, where the nut is driven on the stud in a fast operation with a motor driven tool.

The nut in the hollow form disclosed may be as strong as a solid nut and yet consist of less metal and be lighter in weight. The cost of production, advantages considered, is low, and with the use of unthreaded bolt stock which the invention makes possible, final costs may be much less than present day bolt and nut costs.

What is claimed is:

A nut for cutting its own thread on an unthreaded bolt stud comprising a circular sleeve of thread cutting material internally screw threaded and slotted inward from one end through several turns of the screw thread on an angle inclined to a radiuos of the sleeve and providing screw thread chasing segments, said sleeve having an angularly outstanding annular flange at the opposite end, a shell of larger diameter than the sleeve enclosing the slotted end portion of the sleeve and having an inwardly extending annular flange overstanding the slotted end of the sleeve and forming the base of the nut, said base forming flange having a central opening concentric with and of approximately the root diameter of the screw thread in the sleeve, said shell having an angular side wall of nut shaped formation extending from said base forming flange into abutment with the annular flange of the sleeve, said angular side wall enclosing the circular sleeve and spaced therefrom to provide cavities within the nut for receiving chips cut by the sleeve and an annular weld continuously uniting the annular flange of the sleeve with the abutted end of said side wall of the shell.

References Cited in the file of this patent

UNITED STATES PATENTS

| | | |
|---|---|---|
| 158,259 | Dulin | Dec. 29, 1874 |
| 561,913 | Paquette | June 9, 1896 |
| 1,299,415 | Anderson | Apr. 8, 1919 |
| 1,613,980 | Boyd | Jan. 11, 1927 |
| 2,005,348 | Michell | June 18, 1935 |